Figure 1:
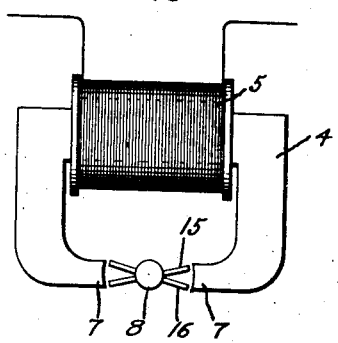

May 6, 1924.

H. E. WARREN 1,493,302

SELF STARTING SYNCHRONOUS MOTOR

Filed April 8, 1920

Inventor:
Henry E. Warren,
by Albert G. Davis
His Attorney.

Patented May 6, 1924.

1,493,302

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

SELF-STARTING SYNCHRONOUS MOTOR.

Application filed April 8, 1920. Serial No. 372,310.

*To all whom it may concern:*

Be it known that I, HENRY E. WARREN, a citizen of the United States, residing at Ashland, in the county of Middlesex, State of Massachusetts, have invented certain new and useful Improvements in Self-Starting Synchronous Motors, of which the following is a specification.

This invention relates to a self-starting synchronous motor. In general, this motor may perform the same functions as the motors shown in several of my prior patents, for example, 1,283,432 and 1,283,435. In these patents I describe a small synchronous motor which is adapted to operate the hands of a secondary clock in an electric time distributing system through appropriate reduction gearing. The great advantages of having such driving motors self-starting have been fully pointed out in these prior patents. This faculty of self-starting is also extremely useful in various other applications of the motor, such, for example, as for driving time switches.

My present invention comprises a new self-starting motor having certain advantageous characteristics. In the self-starting motors that are shown in the patents referred to above, some form of phase splitting device is utilized to produce a rotating field for the stator of the motor. Such a phase-splitting device is also shown in my copending application, Serial No. 215,028, filed February 2, 1918, and assigned to the same assignee as the present application. In the prior application referred to above, I make use of a so-called tuned rotor adapted to be violently oscillated in response to the alternating field set up in the motor. This oscillation in fact becomes so violent that the rotor is very soon thrown into synchronous rotation. In my present invention the use of a rotating field for violently oscillating the rotor may be entirely obviated, although this is not essential. My present invention is thus capable of use, either without any means for producing a rotating field or with such means, where a greater starting torque is required, and in general where a heavier load is operated.

In order that a non-rotating alternating field may oscillate the rotor violently, I find it necessary to make the rotor a compound one. One of the polar elements in said rotor is made of a material having a relatively high magnetic retentivity and the other element with a relatively low magnetic retentivity. By the term "retentivity" as used throughout the specification is meant that quality of any magnetic material that causes its magnetism to lag behind the inducing force. The rotor is so arranged in the alternating magnetic field that the maximum magnetic flux is carried alternately, first by one of said elements and then by the other. There is a wide choice as to the particular form of the two elements making up the compound rotor. I find it expedient, however, to use small pins or bars, one of hard steel and one of soft steel, having their axes perpendicular to the axis of the rotor and displaced from each other by a relatively small angle. Provided the parts are properly proportioned, the alternations of the magnetism produced by the exciting coil circuit vibrate the rotor violently in a manner entirely analogous to the vibrations of the tuned rotor in the application referred to above. It has been found that these vibrations or oscillations may easily be made so great that the rotor is very soon thrown into synchronous rotation with the alternations of the field.

Figure 2:
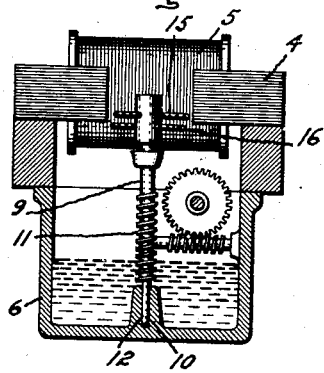
Figure 3:
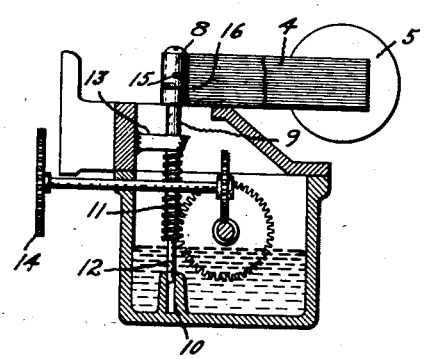

The construction and mode of operation of my invention will be readily understood from the accompanying drawings in connection with the following description. In the drawings, Fig. 1 is a view, mainly diagrammatic, showing the relation of the rotor to the stator; Fig. 2 is a cross-sectional view, showing more in detail how the rotor may be appropriately supported and lubricated; and Fig. 3 is a section at right angles to the section shown in Fig. 2 and showing the relative positions of the rotor and stator when the motor is in operation.

Referring now more in detail to the drawings in which like reference characters refer to corresponding parts throughout, I show a stator 4 preferably made up of laminations, and carrying an energizing coil 5 adapted to be connected to a source of alternating current. The stator 4 comprises the field structure of the motor and is provided with a pair of pole faces 7 oppositely disposed about the rotor 8. The axis of said rotor is located centrally of the two oppositely disposed pole faces 7. The entire stator structure is shown as appropriately carried by a casing 6, comprising upper and lower parts, said lower part carrying the oil for lubricating the moving parts as well as the necessary gearing to reduce the speed of the driven shaft. The particular details of these features of the motor form no part of my present invention and I merely illustrate them as typical of a large variety of structures that may be used.

The rotor 8 carries the two polar elements 15 and 16. The polar element 15 is made of a material such as soft steel, so that the magnetic retentivity is low, while the polar element 16 is made of hard steel with a corresponding higher degree of retentivity. The axes of these polar elements are slightly displaced, as clearly shown in Fig. 1 and the axis of rotation of the entire rotor 8 is arranged perpendicular to the axes of the polar elements. For appropriately carrying the rotor 8, I provide the long shaft 9, which is appropriately supported by a bearing 10 in the bottom of the casing 6, and the bearing 13 carried by the upper part of said casing. The long shaft 9 is provided with a cylindrical journal portion 12, adapted to be received in the bearing 10. The representation in Figures 2 and 3 of the reduction gearing is mainly diagrammatic and is shown as comprising a worm 11, carried by the shaft 9, driving a train of gears which terminates in the driven gear member 14.

The polar elements 15 and 16 may be conveniently made of small cylindrical pins, as indicated, but other well known forms may be resorted to without changing the operation of the motor, so long as they are strongly polar geometrically. The chief requirement to be met by the compound rotor is that it be composed partly of a material having high retentivity and partly of a material having low retentivity such as hard steel and soft steel. When the compound rotor is subjected to a magnetizing force which is alternating, the magnetism carried by the hard steel element 16 builds up after the magnetism in the soft steel element 15; but on the other hand, it retains said magnetism longer after the alternating field has reversed. This is equivalent to a magnetic time lag in the hard steel element and there is a tendency for each of said two elements to carry the magnetic flux alternatively. This results in a severe oscillation, which very soon brings about synchronous rotation. As mentioned above, it is also possible to augment the starting torque by the use of shaded pole pieces as in the motors formerly invented by me, but such an expedient is not indispensable.

I also show in Figures 2 and 3 the positions of the rotor when at rest and when rotated. When at rest, the rotor has its center somewhat below the center of the field produced by the stator 4. This condition of affairs is shown in Fig. 2. However, when the motor is operating the rotor is pulled into a position symmetrical with respect to the stator laminations as shown in Fig. 3. This action has the effect of reducing the friction of the rotor shaft by elevating it clear of the bearing 10. This feature, however, is not new in this application, my prior patents disclosing substantially similar devices.

While I have shown in the accompanying drawing the preferred embodiment of my device, my invention is not limited thereto and I aim in the appended claims to embrace all modifications falling fairly within the scope of my invention.

What I claim as new and desire to secure by Letters Patent of the United States, is,—

1. A self starting alternating current motor comprising a stator provided with an alternating current exciting winding adapted to produce a non-rotating magnetic field, and an unwound polar rotor therefor, having axes of different magnetic retentivity, whereby said rotor is caused to oscillate in said field up to a point of rotation and thereafter to rotate synchronously.

2. A self-starting synchronous motor having means for producing a non-rotating alternating magnetic field, and a rotor adapted to be vibrated in response to the alternations of said alternating field up to the point of rotation.

3. In a self-starting synchronous motor for alternating currents, means for producing a magnetic field, and a rotor having a polar element of low magnetic retentivity and a polar element of relatively high magnetic retentivity, said polar elements being angularly displaced from each other.

4. In a self-starting synchronous motor for alternating currents, means for producing a magnetic field, a rotor in the influence of said field having a soft steel polar element, and a hard steel polar element, said two elements having their axes angularly displaced from each other.

5. In a self-starting synchronous motor, means for producing a magnetic field, and a rotor comprising two polar elements of unlike magnetic material and adapted to be placed in strong oscillation by means of said magnetic field.

6. In a self-starting synchronous motor, a magnetic core, an exciting winding for said core adapted to be supplied from an alternating current source, and a rotor having a polar element of relatively low magnetic retentivity and a polar element of relatively high magnetic retentivity, said polar elements being angularly disposed from each other.

7. In a self-starting synchronous motor, a magnetic core, an exciting winding for said core adapted to be supplied from an alternating current source, and a rotor having a soft steel polar element, and a hard steel polar element, said polar elements being angularly disposed from each other.

In witness whereof, I have hereunto set my hand this 30th day of March, 1920.

HENRY E. WARREN.